(12) United States Patent
Kim et al.

(10) Patent No.: US 10,736,096 B2
(45) Date of Patent: Aug. 4, 2020

(54) DEVICE AND METHOD FOR DETECTING FILTER BANK MULTI CARRIER WAVE SYMBOLS IN WIRELESS COMMUNICATION SYSTEM

(71) Applicants: Samsung Electronics Co., Ltd., Suwon-si, Gyeonggi-do (KR); INDUSTRY-ACADEMIC COOPERATION FOUNDATION, YONSEI UNIVERSITY, Seoul (KR)

(72) Inventors: Chanhong Kim, Suwon-si (KR); Dae-Sik Hong, Seoul (KR); Sung-Woo Weon, Incheon (KR); Won-Suk Chung, Seongnam-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 125 days.

(21) Appl. No.: 15/578,144

(22) PCT Filed: May 27, 2016

(86) PCT No.: PCT/KR2016/005627
§ 371 (c)(1),
(2) Date: Nov. 29, 2017

(87) PCT Pub. No.: WO2016/195328
PCT Pub. Date: Dec. 8, 2016

(65) Prior Publication Data
US 2018/0167939 A1 Jun. 14, 2018

(30) Foreign Application Priority Data
May 29, 2015 (KR) .................. 10-2015-0076074

(51) Int. Cl.
*H04W 72/04* (2009.01)
*H04L 27/26* (2006.01)
(Continued)

(52) U.S. Cl.
CPC ..... *H04W 72/0446* (2013.01); *H04L 27/2662* (2013.01); *H04L 27/2691* (2013.01);
(Continued)

(58) Field of Classification Search
CPC .......... H04L 27/2662; H04L 27/2691; H04W 72/0446; H04W 56/0045; H04W 72/048; H04W 72/082
See application file for complete search history.

(56) References Cited

U.S. PATENT DOCUMENTS 9,596,105 B1 * 3/2017 Smekhov ............ H04L 27/2665
9,735,940 B1 * 8/2017 Bakr ..................... H04L 5/0053
(Continued)

FOREIGN PATENT DOCUMENTS

EP 1330087 A2 * 7/2003 ......... H04L 27/2662
EP 1330087 A2 7/2003
(Continued)

OTHER PUBLICATIONS

ISA/KR, "International Search Report," Application No. PCT/KR2016/005627, dated Aug. 24, 2016, 3 pages.
(Continued)

*Primary Examiner* — Chi H Pham
*Assistant Examiner* — Weibin Huang

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for operating a base station in a wireless communication system according to an embodiment includes determining
(Continued)

interference between symbols of a signal received from at least one terminal, determining a time offset of the received signal based on the determined interference, and determining a detection interval of the signal received from the at least one terminal based on the time offset.

14 Claims, 18 Drawing Sheets

(51) Int. Cl.
 *H04W 56/00* (2009.01)
 *H04W 72/08* (2009.01)
(52) U.S. Cl.
 CPC ..... *H04W 56/0045* (2013.01); *H04W 72/048* (2013.01); *H04W 72/082* (2013.01); *H04L 27/264* (2013.01)

(56) References Cited

U.S. PATENT DOCUMENTS

| | | | |
|---|---|---|---|
| 2004/0125767 A1* | 7/2004 | Yu | H04B 7/06 370/330 |
| 2005/0180533 A1 | 8/2005 | Hamman | |
| 2012/0324308 A1* | 12/2012 | Goto | H04L 1/005 714/752 |
| 2013/0286959 A1 | 10/2013 | Lou et al. | |
| 2014/0321450 A1* | 10/2014 | Zhang | H04L 27/2665 370/350 |
| 2015/0063507 A1 | 3/2015 | Dore et al. | |
| 2016/0020857 A1* | 1/2016 | Jia | H04L 25/03019 398/208 |
| 2016/0269217 A1 | 9/2016 | Nam et al. | |
| 2017/0086153 A1* | 3/2017 | Yoon | H04W 56/001 |

FOREIGN PATENT DOCUMENTS

| | | |
|---|---|---|
| KR | 10-2015-0035424 A | 4/2015 |
| WO | 2014044651 A1 | 3/2014 |

OTHER PUBLICATIONS

Stitz, Tobias Hidalgo, et al., "Pilot-Based Synchronization and Equalization in Filter Bank Multicarrier Communications," EURASIP Journal on Advances in Signal Processing, vol. 2010, Article ID 741429, Jun. 16, 2009, 18 pages.

* cited by examiner

DEVICE AND METHOD FOR DETECTING FILTER BANK MULTI CARRIER WAVE SYMBOLS IN WIRELESS COMMUNICATION SYSTEM

CROSS-REFERENCE TO RELATED APPLICATIONS AND CLAIM OF PRIORITY

The present application claims priority under 35 U.S.C. § 365 and is a 371 National Stage of International Application No. PCT/KR2016/005627 filed May 27, 2016, which claims the benefit of Korean Patent Application No. 10-2015-0076074 filed May 29, 2015, the disclosures of which are fully incorporated herein by reference into the present disclosure as if fully set forth herein.

TECHNICAL FIELD

In generation, the following explanations relate to a wireless communication system, and more particularly, relate to a method and an apparatus for synchronizing signals when a base station receives signals from multiple terminals in an uplink environment of the wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The wireless communication system can change a shape of a waveform by multiplying a signal by a filter. Thus, the wireless communication system can transmit a signal which is robust to time delay and has a small sidelobe size. The FBMC scheme can increase a symbol length through a filtering process, overlap and sum the symbols, and then finally transmit them. In so doing, it is advantageous that a Guard Interval (GI) is not needed thanks to gains of the time and the sidelobe size.

SUMMARY

The following explanations are to provide a method and an apparatus for determining a time offset by considering Inter Symbol Interference (ISI) in a mobile communication uplink environment.

An embodiment of the present invention is to provide a method and an apparatus for determining a size of a time offset per user terminal by using ISI of Filter Bank Multi-Carrier (FBMC) symbols in a base station of a wireless communication system.

An embodiment of the present invention is to provide a method and an apparatus for determining a sign of a time offset using a time offset size determined by a base station in a wireless communication system.

An embodiment of the present invention is to provide a method and an apparatus for determining a time offset through Inter-User Interference (IUI) compensation in a base station of a wireless communication system.

Also, an embodiment of the present invention is to provide a method and an apparatus for determining a receive interval to minimize performance degradation caused by different propagation delays between users in a wireless communication.

A method for operating a base station in a wireless communication system according to an embodiment includes determining interference between symbols of a signal received from at least one terminal, determining a time offset of the received signal based on the determined interference, and determining a detection interval of the signal received from the at least one terminal based on the time offset.

An apparatus of a base station in a wireless communication system according to another embodiment includes a communication unit for determining interference between symbols of a signal received from at least one terminal, and determining a time offset of the received signal based on the determined interference, and a control unit for determining a detection interval of the signal received from the at least one terminal based on the determined time offset.

According to an embodiment of the present invention, a method for determining a time offset using Inter Symbol Interference (ISI) of a signal transmitted from each terminal in a Filter Bank Multi Carrier (FBMC) system is provided. A method for determining a synchronization point to minimize a detection error of signals arriving at a base station through different propagation times from several terminals is provided.

DETAILED DESCRIPTION

Figure 1:
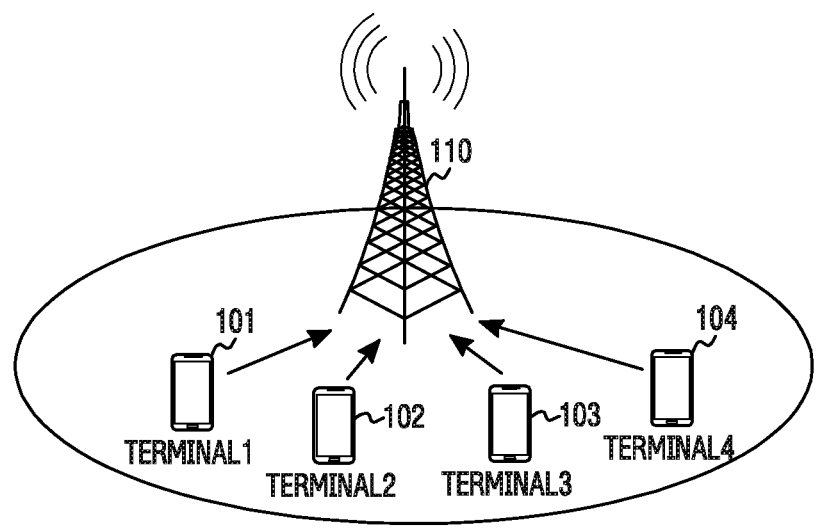
FIG. 1 depicts a base station and terminals in a wireless communication system according to an embodiment of the present invention.

Hereinafter, various embodiments are described in detail with reference to the accompanying drawings. However, it should be understood that it is not intended to limit the present disclosure to a particular form but the intention is to cover various modifications, equivalents, and/or alternatives of the embodiments of the present disclosure. In relation to descriptions of the drawings, like reference numerals can be used for similar components. At this time, the detailed description of known functions and configurations which can blur the subject matter of the present invention will be omitted. In the following, it is noted that only parts necessary for understanding operations according to various embodiments of the present invention are explained and that other parts there will be omitted not to obscure the subject matter of the present invention.

In the disclosure, an expression such as "have", "can have", "include" or "can include" refers to presence of a corresponding characteristic (e.g., a number, a function, an operation, or a component such as a part), and does not exclude presence of an additional characteristic.

Terms used in the present disclosure are used for only describing a specific embodiment and are not intended to limit the scope of other embodiments. A singular form can include a plurality of forms unless it is explicitly differently represented. All the terms used herein, including technical and scientific terms, can have the same meanings as terms that are generally understood by those skilled in the art. The terms defined in a general dictionary can be interpreted to have the same or similar meanings as in the context of the relevant art, and, unless explicitly defined herein, terms in this disclosure shall not be interpreted ideally or excessively as formal meanings. In some cases, even the terms defined in this disclosure cannot be interpreted to exclude the embodiments of the present disclosure.

Embodiments of the present invention provide a method and an apparatus for, when several terminals send a signal to a base station through an uplink in a wireless communication system, determining a time offset using Inter Symbol Interference (ISI) of signals received from the terminals in the base station. Also, they provide a method and an apparatus for tracking synchronization of the base station to minimize performance degradation caused by a time offset due to different propagation times.

In the following, terms indicating signals or symbols, terms indicating signal processing means, and terms indicating communication entities are mentioned for the sake of explanations. Accordingly, the present invention is not limited to the terms to be described, and can use other terms having technically identical meaning.

FIG. 1 depicts a base station and terminals in a wireless communication system according to an embodiment of the present invention.

FIG. 1 shows only one base station and four terminals for the sake of descriptions, and can include more base stations and more terminals. The base station 110 is responsible for radio access of the terminals 101 through 104 and can have coverage of a certain geographic range. The base station 110 can provide the radio access of the terminals 101 through 104 located within the coverage. The terminals 101 through 104 communicate with the base station 110 and can be a terminal which is a start point or an end point of data transmission. The terminals 101 through 104 can communicate with the base station over a radio channel.

In the embodiment of the present invention, the terminals 101 through 104 can transmit Filter Bank Multi Carrier (FBMC) symbols to the base station in accordance with a preset frame. It is assumed that the base station 110 process signals of the terminals 101 through 104 all together in order to receive and detect the transmitted signals.

The terminals 101 through 104 are presented as an example of an electronic device in FIG. 1 and are not limited in type. The electronic device according to various embodiments of the present disclosure can include at least one of, for example, a smartphone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPC player, a mobile medical device, a camera, or a wearable device.

Hereafter, an electronic device according to various embodiments is described by referring to the attached drawings. In this disclosure, a term "user" can refer to a person using the electronic device or a device (e.g., an artificial intelligence electronic device) using the electronic device.

Figure 2:
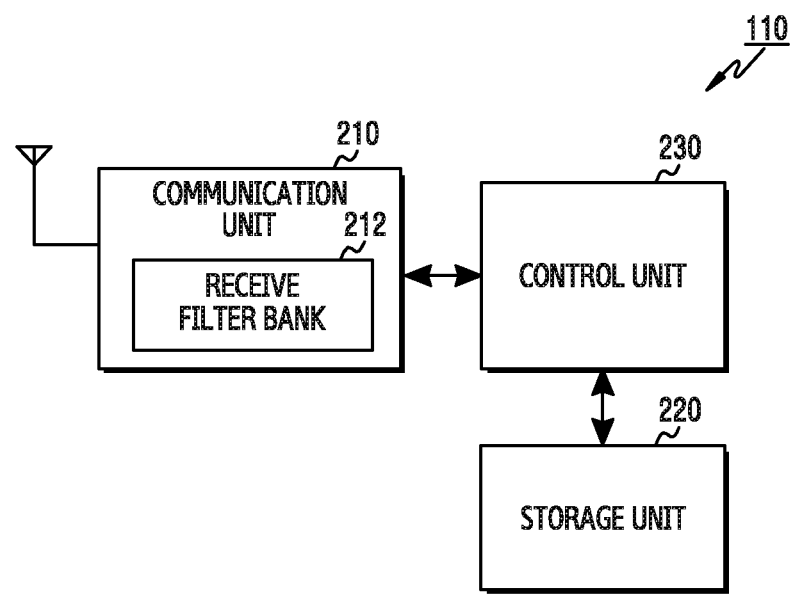
FIG. 2 depicts a block diagram of a base station apparatus in a wireless communication system according to an embodiment of the present invention.

FIG. 2 depicts a block diagram of a base station apparatus in a wireless communication system according to an embodiment of the present invention. A term such as 'unit' and 'part' used hereafter indicates a unit for processing at least one function or operation and can be implemented using hardware, software, or a combination of hardware and software.

Referring to FIG. 2, the base station 110 includes a communication unit 210, a storage unit 220, and a control unit 230.

The communication unit 210 performs functions for sending and receiving signals over a radio channel. For example, the communication unit 210 performs a conversion function between a baseband signal and a bit string according to a physical layer standard of the system. For example, for data transmission, the communication unit 210 generates complex symbols by encoding and modulating a transmit bit string. Also, in data reception, the communication unit 210 restores a receive bit string by demodulating and decoding a baseband signal. Also, the communication unit 210 up-converts the baseband signal to a Radio Frequency (RF) band signal, transmits it via an antenna, and down-converts an RF band signal received via the antenna to a baseband signal. In particular, the communication unit 210 includes a receive filter bank 212 for interpreting an FBMC symbol. Further, the communication unit 210 can include a transmit filter, a receive filter, an amplifier, a mixer, an oscillator, a Digital to Analog Convertor (DAC), an Analog to Digital Convertor (ADC), and the like.

Also, the communication unit 210 can include a plurality of RF chains. Further, the communication unit 210 can conduct beamforming. For the beamforming, the communication unit 210 can adjust a phase and a magnitude of signals transmitted and received via a plurality of antennas or antenna elements. Further, the communication unit 210 can include a plurality of communication modules to support a plurality of different radio access technologies. The communication unit 210 sends and receives the signals as above. Hence, the communication unit 210 can be referred to as a transmitting unit, a receiving unit, or a transceiving unit.

The storage unit 220 stores a basic program for operating the base station 110, an application program, and data such as setting information. In particular, the storage unit 220 can store data for signaling with the terminal, that is, data for analyzing a message from the terminal. Also, the storage unit 220 provides the stored data according to a request of the control unit 230.

The control unit 230 controls general operations of the base station 110. For example, the control unit 230 sends and receives signals through the communication unit 210. Also, the control unit 230 records and reads data in and from the storage unit 220. For doing so, the control unit 230 can include at least one processor. For example, the control unit 230 can include a Communication Processor (CP) for controlling the communication and an Application Processor (AP) for controlling a higher layer such as an application program. According to an embodiment of the present invention, the control unit 230 can receive selectively shifted FBMC symbols and interpret the FBMC symbols based on a shift pattern of the FBMC symbols. For example, the control unit 230 can control the base station 110 to perform FBMC symbol transmission processes to be explained.

Figure 3:
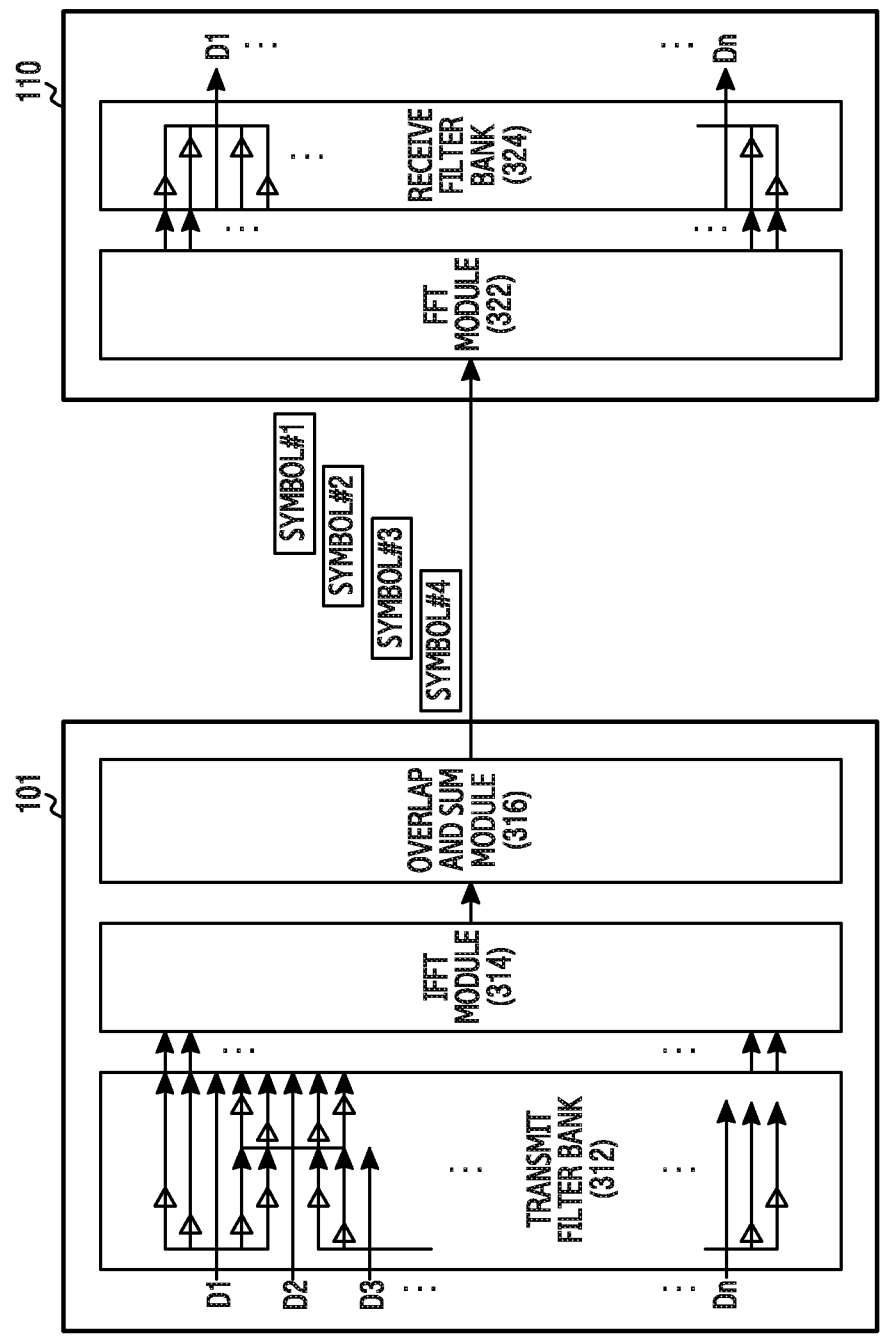
FIG. 3 depicts an example of functional configuration of a terminal and a base station for generating and interpreting Filter Bank Multi Carrier (FBMC) symbols in a wireless communication system according to an embodiment of the present invention.

FIG. 3 depicts an example of functional configuration of a terminal and a base station for generating and interpreting FBMC symbols in a wireless communication system according to an embodiment of the present invention. FIG. 3 depicts that filtering is conducted in a frequency domain. Hereafter, a term such as 'unit' and 'part' indicates a unit for processing at least one function or operation, and can be implemented using hardware, software, or a combination of hardware and software.

Referring to FIG. 3, the terminal 110 includes a transmit filter bank 312, an Inverse Fast Fourier Transform (IFFT) module 314, and an overlap and sum module 316. The terminal 101 is presented as an example of one of several terminals of FIG. 1. The base station 110 includes an FFT module 322 and a receive filter bank 342.

The transmit filter bank 312 oversamples and then filters data symbols D1 through Dn. In FIG. 3, while a filter order K is 2 and an oversampling factor is 5(=2×K+1), other filter order and other oversampling factor can be applied. For example, in case of D1, the transmit filter bank 312 generates the same sample values as five D1 values by oversampling D1, and multiples the five sample values and filter coefficients. Similarly, the transmit filter bank 312 oversamples and multiples D1 through D1 by the filter coefficients. In so doing, some of the filtered samples of adjacent data symbols are summed up. For example, two samples of the filtered D1 are summed with two samples of the filtered D2 respectively. In so doing, one of the adjacent data symbols can be divided into a real value and an imaginary value of a complex symbol, or different filters can be applied to the adjacent data symbols so that the base station 110 can decompose the summed sampling values.

The IFFT module 314 performs an IFFT operation on the samples of the filtered data symbols which are output from the transmit filter bank 312. In other words, the IFFT module 314 generates an FBMC symbol including D1 through Dn using the samples of the filtered data symbols. Namely, the IFFT module 314 generates a multi-carrier signal through the IFFT operation. In so doing, since the data symbol is oversampled to D1 through Dn, a length of the FBMC symbol is greater than the number n of the data symbols. The overlap and sum module 316 partially overlaps and sums the FBMC symbols generated by the IFFT module 314. The FBMC symbols are not transmitted independently on a time axis, but are transmitted overlappingly. More specifically, a rear end of a first FBMC symbol and a front end of a second FBMC symbol overlap. That is, the overlap and sum module 316 generates a transmit signal by arranging the FBMC symbols at predefined intervals and summing samples of the FBMC symbols on the same time. Herein, the predefined interval can be the number n of the data symbols.

Although not depicted in FIG. 3, the base station 110 can further include at least one module for transmitting the transmit signal generated by the overlap and sum module 316. The transmit signal generated by the overlap and sum module 316 is a digital baseband signal. Accordingly, the transmitting stage can further include at least one module for converting the transmit signal to an analog signal and up-converting to an RF signal. Next, the transmit signal including the FBMC symbols can be received at the base station 110. Similarly, the base station 110 can further include at least one module for converting the received signal to a digital baseband signal.

The FFT module 322 performs an FFT operation on the received signal. In so doing, the FFT module 322 extracts samples corresponding to one FBMC symbol length from the received signal generated by overlapping and summing the FBMC symbols, and conducts the FFT operation. The receive filter bank 324 filters and downsamples samples corresponding to one FBMC symbol provided from the FFT module 332. Hence, the data symbols D1 through Dn can be restored. For example, to recover D1, the receive filter bank 324 multiples five samples of the samples of the FFT-operated receive signal by the filtering factors, and sums products.

Figure 4:
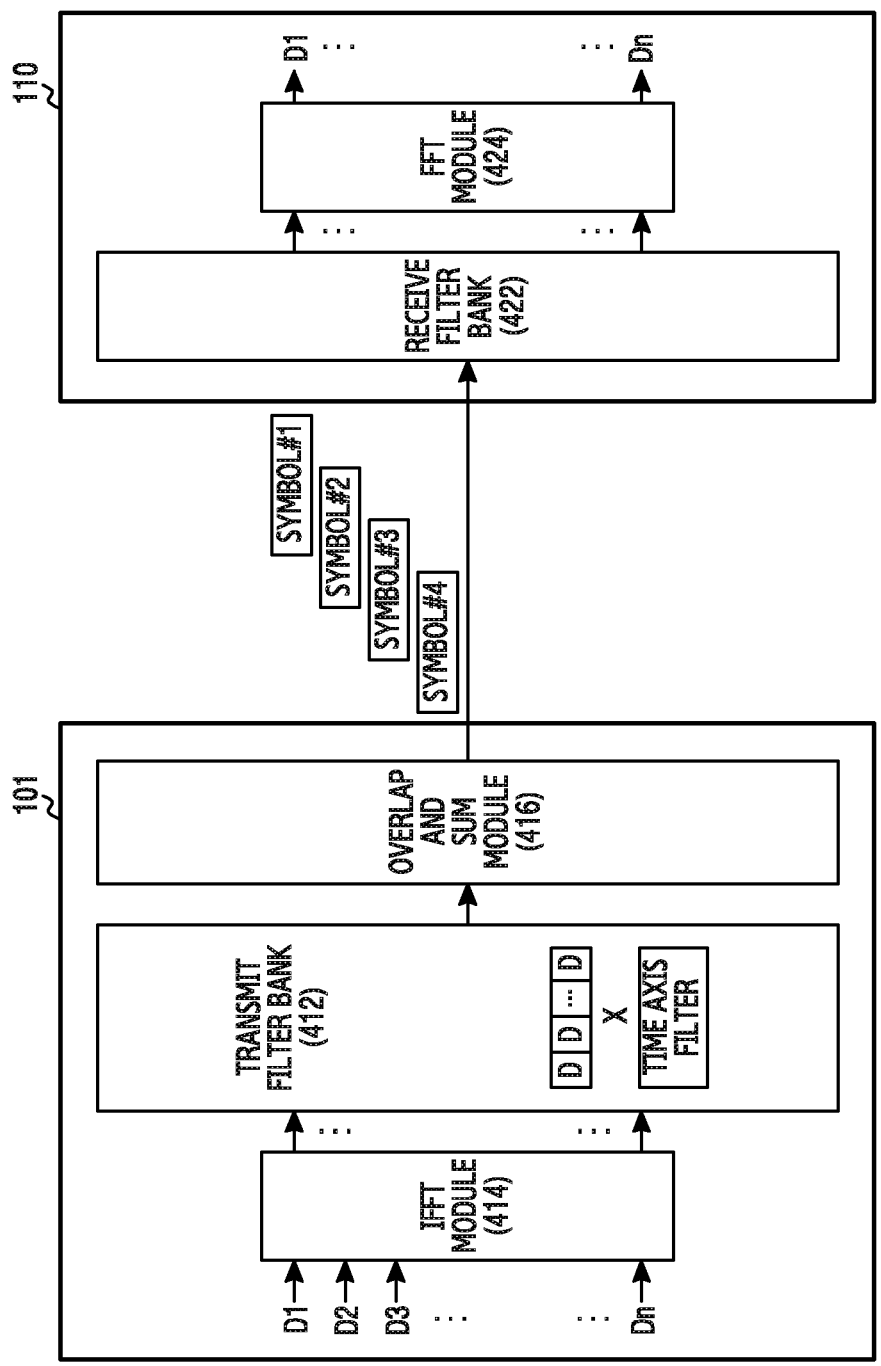
FIG. 4 depicts another example of functional configuration of a transmitting stage and a receiving stage for generating and interpreting FBMC symbols in a wireless communication system according to an embodiment of the present invention.

FIG. 4 depicts another example of functional configuration of a transmitting stage and a receiving stage for generating and interpreting FBMC symbols in a wireless communication system according to an embodiment of the present invention. Hereafter, a term such as 'unit' and 'part' indicates a unit for processing at least one function or operation, and can be implemented using hardware, software, or a combination of hardware and software.

Referring to FIG. 4, the terminal 101 includes an IFFT module 414, a transmit filter bank 412, and an overlap and sum module 416. The base station 110 includes a receive filter bank 422 and an FTT module 424.

The IFFT module 414 performs an IFFT operation on data symbols D1 through Dn. As a result, an IFFT result equals the number n of the data symbols. The transmit filter bank 412 performs time-axis filtering on the IFFT result. The transmit filter bank 412 is an implementation of the transmit filter bank 312 of FIG. 3 in a time domain, and produces the same output as the IFFT module 314 of FIG. 3. The operation of the transmit filter bank 312 of FIG. 3 corresponds to a convolution operation on a frequency axis, and the corresponding time-domain operation can be implemented using signal repetition and filtering. More specifically, the transmit filter bank 414 duplicates the IFFT result IFFT{D} fed from the IFFT module 414 as many as the filter order of the transmit filter bank 312 of FIG. 3, and multiplies a time domain transmit filter corresponding to the frequency domain filter of the transmit filter bank 312 of FIG. 3. Hence, FBMC symbols are generated.

The overlap and sum module 416 partially overlaps and sums the FBMC symbols generated by the transmit filter bank 412. The FBMC symbols are not transmitted independently on the time axis, but are transmitted overlappingly. More specifically, a rear end of a first FBMC symbol and a front end of a second FBMC symbol overlap. That is, the overlap and sum module 416 generates a transmit signal by arranging the FBMC symbols at predefined intervals and summing samples of the FBMC symbols on the same time. Herein, the predefined interval can be the number n of the data symbols.

Although not depicted in FIG. 4, the terminal 101 can further include at least one module for transmitting the transmit signal generated by the overlap and sum module 416. The transmit signal generated by the overlap and sum module 416 is a digital baseband signal. Accordingly, the transmitting stage can further include at least one module for converting the transmit signal to an analog signal and up-converting to an RF signal. Next, the transmit signal including the FBMC symbols can be received at the base station 110. Similarly, the base station 110 can further include at least one module for converting the received signal to a digital baseband signal.

The receive filter bank 422 performs time domain filtering using a receive filter corresponding to the transmit filter used in the transmit filter bank 414. In so doing, the receive filter bank 422 extracts samples corresponding to one FBMC symbol length from the received signal generated by overlapping and summing the FBMC symbols, and conducts receive filtering. The receive filter bank 422 splits the signal according to a repetition order and sums the split signals. Hence, the signal (e.g., IFFT{D}) before the transmit filtering can be restored. The FFT module 242 performs the FFT operation on the signal fed from the receive filter bank 422. Thus, the data symbols D1 through Dn can be restored.

Figure 5:
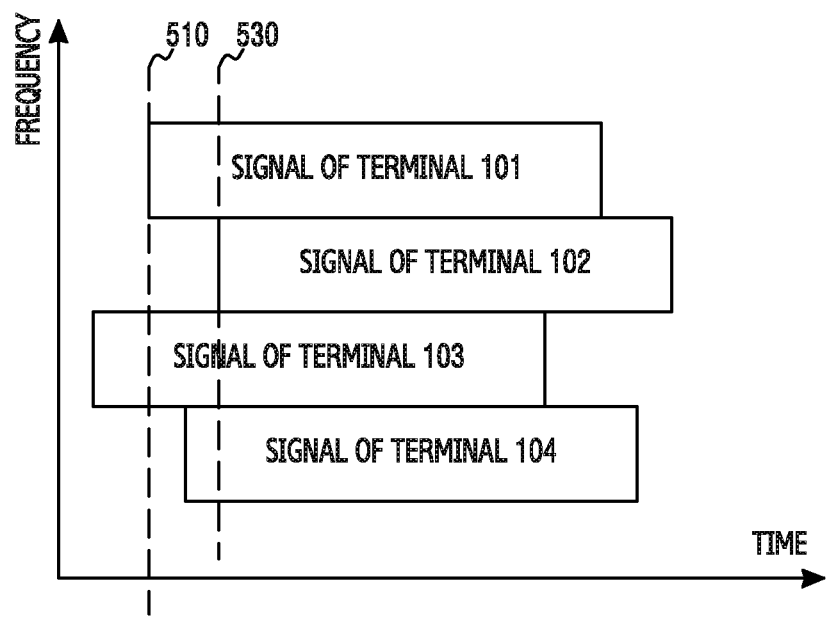
FIG. 5 depicts an example of a signal reception time of terminals in a wireless communication system according to one embodiment of the present invention.

FIG. 5 depicts an example of a signal reception time of terminals in a wireless communication system according to one embodiment of the present invention. In FIG. 5, a reference numeral 510 indicates a first synchronization point based on a signal of the terminal 101 of FIG. 1, and a reference numeral 530 indicates a second synchronization point based on a signal of a terminal 103.

Referring to FIG. 5, terminals 101 through 104 can send FBMC symbols to the base station 110 in accordance with a frame of the base station 110. In so doing, the base station 110 can allocate orthogonal resources to signals of the terminals in time and frequency domains. For example, the base station 110 can allocate different subcarriers to the terminal 101 and the terminal 102. However, propagation times of the signals arriving at the base station 110 can differ according to a distance of the terminal. Hence, the times when the signals of the terminals 101 through 104 allocated the same time slot arrive at the base station 110 can differ. This problem can be solved partially by controlling a time offset within a certain range through Timing Advance (TA) control.

However, the FBMC scheme does not use a Cyclic Prefix (CP). Accordingly, the time offset within the certain range can cause performance degradation in signal detection. Hence, the base station 110 needs to determine how much the time deviates from a reference point with respect to the signals received from the terminals 101 through 104. Also, the base station 110 can determine the time offset for the signals of the terminals and then determine a new synchronization point based on it. For example, referring to FIG. 5, when the four terminals 101 through 104 transmit a signal to the base station 110, the base station 110 can determine a signal detection interval by considering all of time offsets of the signals. Herein, the signal detection interval can indicate an interval for extracting sample values which are subject to the FFT operation in order to detect one FBMC symbol. The detection interval can be referred to as a 'detection window,' and a start point of the detection interval can be referred to as 'a detection point' or a 'synchronization point'. Specifically, the base station 110 can determine the first synchronization point 510 as a final synchronization point. In this case, a detection error can be very small when detecting the signal of the terminal 101. By contrast, the signals of the other terminals 102 through 104 have relatively considerable distortion due to the time offset, and their detection error can increase. For example, the base station 110 can determine the synchronization point based on the terminal 102. In this case, the detection error can be very small when detecting the signal of the terminal 102. However, the signals of the other terminals 101, 103, and 104 can increase the detection error due to the distortion caused by the time error. Thus, a method for determining the synchronization point which minimizes the performance degradation in consideration of all the terminals is needed.

Figure 6:
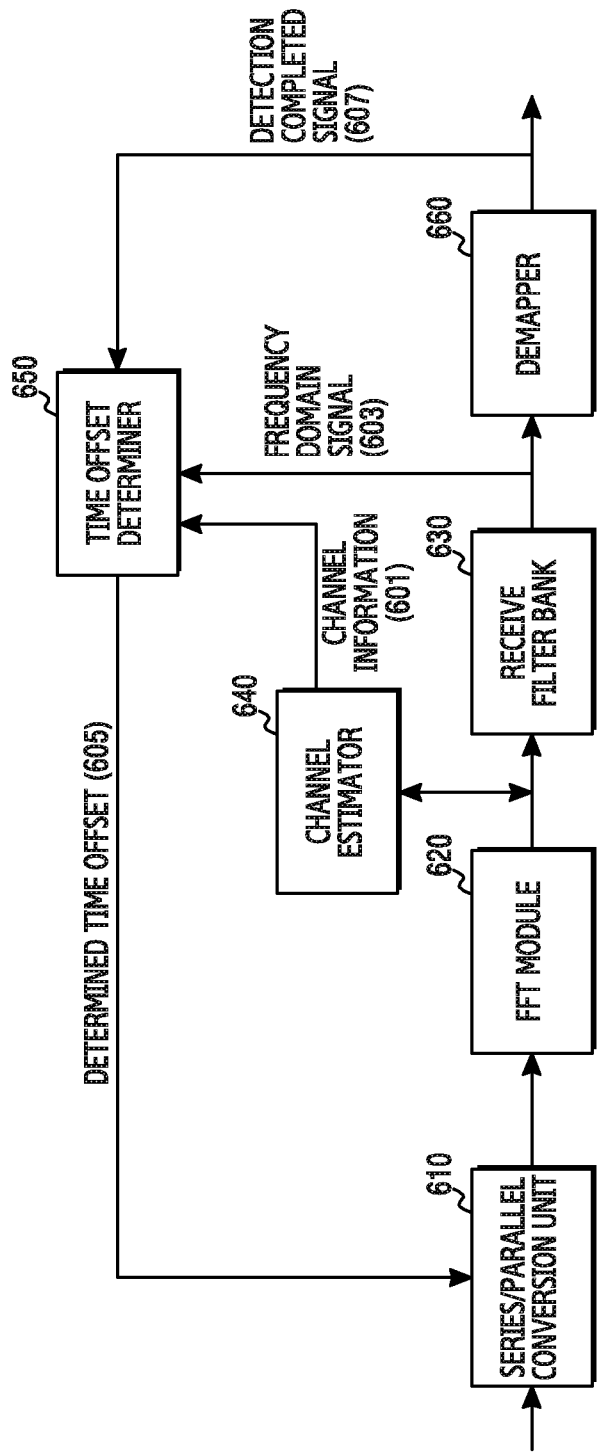
FIG. 6 is a block diagram of a communication unit in a base station apparatus in a wireless communication system according to various embodiments of the present invention.

FIG. 6 is a block diagram of a communication unit in a base station apparatus in a wireless communication system according to an embodiment of the present invention. FIG. 6 depicts a functional structure of the communication unit 210 of the base station 110 of FIG. 2.

Referring to FIG. 6, the communication unit 210 can include a series/parallel conversion unit 610 which converts a data size input in series, an FFT module 620 which sequentially FFT-operates data blocks input from the series/parallel conversion unit 610, a receive filter bank 630 which filters the FFT-operated data blocks through a block-based weighted sum in the frequency axis, a channel estimator 640 which obtains the data signal size and forwards channel information 601 to a time offset determiner 650, the time offset determiner 650 which determines a size and a sign of a time offset using a frequency domain signal 603 received from the receive filter bank 630 and the channel information 601 received from the channel estimator 640, and a demapper 660 which demaps the signal.

The series/parallel conversion unit 610 can convert the input series data to the data blocks having the same size as the size of the FFT module 620 and thus sequentially provide them to the FFT module 620. Herein, the data block size can be defined as a data length, the number of the data, or the number of subcarriers.

The FFT module 620 can sequentially receive K-ary data blocks of the size M from the series/parallel conversion unit 610. The FFT module 620 can sequentially FFT-operate the K-ary data blocks which are input in sequence.

The receive filter bank 630 can filter and downsample samples corresponding to one FBMC symbol provided from the FFT module 620, and forward the filtered frequency domain signal 603 to the time offset determiner 650 and the demapper 660.

The channel estimator 640 can estimate an amplitude and a phase of a channel having a fading characteristic where a channel condition irregularly varies in the time and frequency domains. Also, the channel estimator 640 can estimate a size and a reference phase of a carrier which is affected by the channel in the synchronization detection. The channel estimator 640 can forward the channel information 601 including the estimated size and reference phase of the carrier to the time offset determiner 650.

The time offset determiner 650 can receive the frequency domain signal 603 from the receive filter bank 630 and the channel information 601 from the channel estimator 640. The channel information 601 can be used to determine ISI with Inter-User Interference (IUI) compensated. The time offset determiner 650 can also receive a previous signal 607 detected completely from the demapper 660. With the received channel information 601, frequency domain signal 603, and detection completed signal 607, the time offset determiner 650 can determine a time offset 605 of the signals received from the terminals 101 through 104. The determined time offset 605 can include size information of the time offset and sign information of the time offset. The determined time offset 650 can be provided to the series/parallel conversion unit 610 to repeat the process, and thus the effect from other external factor than the time offset, such as user interference, can be reduced.

The demapper 660 can divide the signals output from the receive filter bank 630 according to a processing path and provide them to respective processing blocks. In particular, the demapper 660 can send the detection completed signal 607 to the time offset determiner 650.

Figure 7:
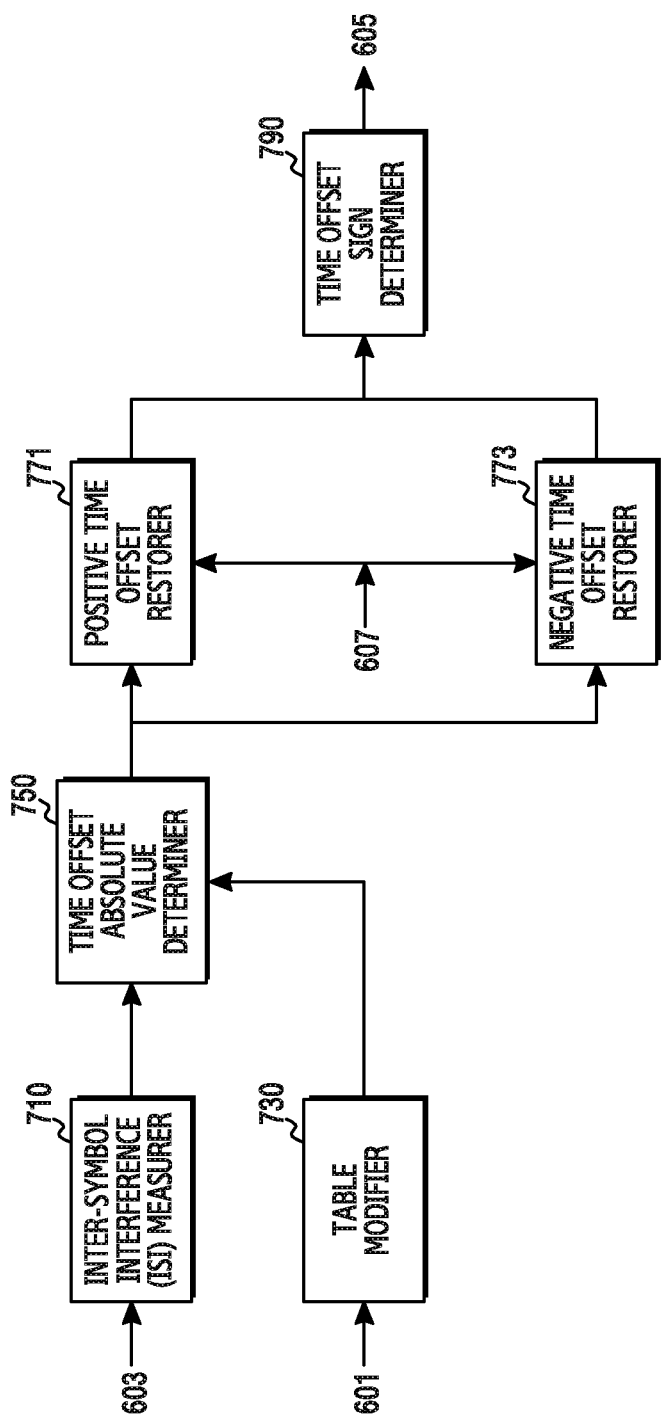
FIG. 7 is a block diagram of a time offset determiner of a base station apparatus in a wireless communication system according to an embodiment of the present invention.

FIG. 7 is a block diagram of a time offset determiner of a base station apparatus in a wireless communication system according to various embodiments of the present invention. FIG. 7 depicts a functional structure of the time offset determiner 650 of FIG. 6.

Referring to FIG. 7, the time offset determiner 650 can include an ISI measurer 710 which measures ISI of a signal received from each terminal, a table modifier 730 which modifies an ISI versus time offset table using channel information, a time offset absolute value determiner 750 which determines a time offset size using the measured ISI and the modified table, a positive time offset restorer 771 which cancels the detection completed signal 607 by setting a sign of the determined absolute value to a positive value and re-measures the ISI, a negative time offset restorer 773 which cancels the detection completed signal 607 by setting the sign of the determined absolute value to a negative value and re-measures the ISI, and a time offset sign determiner 790 which determines the sign of the time offset based on the ISI re-measured by the positive time offset restorer 771 and the negative time offset restorer 773, and sends the determined time offset 605 to the series/parallel conversion unit 610.

The ISI measurer 710 can receive the frequency domain signal 603 from the receive filter bank 630. The ISI measurer 710 can measure ISI of the received signal, and send the measured ISI to the time offset absolute value determiner 750. The ISI can be measured per terminal. Herein, the ISI can include at least one of an Error Vector Magnitude (EVM) or a Signal to Noise power Ratio (SNR).

The table modifier 730 can receive the channel information 601 from the channel estimator 640. Based on the channel information, the table modifier 730 can modify the ISI versus time offset absolute value table. For example, the table modifier 730 can obtain a channel condition (e.g., noise level, etc.) from the channel information of the received signal. According to the channel condition, a curvature and a vertical value (a y-intercept value) of an EVM 1010 can change in FIG. 10. For example, for considerable noise in the channel, the vertical intercept value of the EVM 1010 can increase. By contrast, when smaller noise in the channel, the vertical intercept value of the EVM 1010 can decrease. In response to the change of the curvature and the vertical value of the EVM 1010 according to the channel condition, an absolute value of the time offset can differ. The table modifier 730 can generate the modified table of the time offset value corresponding to the EVM 1010. The table modifier 730 can send the modified table to the time offset absolute value determiner 750.

The time offset absolute value determiner 750 can receive the ISI value from the ISI measurer 710. Also, the time offset absolute value determiner 750 can receive the modified table from the table modifier 730. The time offset absolute value determiner 750 can determine the absolute value of the time offset by applying the received ISI value to the received modified table. The time offset absolute value determiner 750 can send the determined time offset absolute value to the positive time offset restorer 771. Also, the time offset absolute value determiner 750 can send the determined time offset absolute value to the negative time offset restorer 773.

The positive time offset restorer 771 can receive the time offset absolute value from the time offset absolute value determiner 750. Also, the positive time offset restorer 771 can receive the detection completed signal 607 from the demapper 660. The positive time offset restorer 771 can re-measure the ISI based on the received time offset absolute value and detection completed signal 607. The ISI re-measurement method is as follows. The positive time offset restorer 771 can shift the detection completed signal 607 in a positive direction by the determined time offset absolute value. Also, the shifted signal can be re-shifted by applying an effect of a corresponding user channel. The shifted detection completed signal can be removed from the receive signal and a power of the receive signal can be measured. The positive time offset restorer 771 can send the measured power to the time offset sign determiner 790.

The negative time offset restorer 773 can receive the time offset absolute value from the time offset absolute value determiner 750. Also, the negative time offset restorer 773 can receive the detection completed signal 607 from the demapper 660. The negative time offset restorer 773 can re-measure the ISI based on the received time offset absolute value and detection completed signal 607. The ISI re-measurement method is as follows. The negative time offset restorer 773 can shift the detection completed signal 607 in a negative direction by the determined time offset absolute value. Also, the shifted signal can be re-shifted by applying an effect of a corresponding user channel. The shifted detection completed signal can be removed from the receive signal and a power of the receive signal can be measured. The negative time offset restorer 773 can send the measured power to the time offset sign determiner 790.

The time offset sign determiner 790 can compare the signal powers received from the positive time offset restorer 771 and the negative time offset restorer 773. Based on a comparison result, the time offset sign determiner 790 can determine a sign of the time offset. The time offset sign determiner 790 can select the time offset sign of the low signal power. For example, it can be assumed that the signal power received from the positive time offset restorer 771 is smaller than the signal power received from the negative time offset restorer 773. In this case, the time offset sign determiner 790 can determine the time offset sign as a positive value. Conversely, it can be assumed that the signal power received from the negative time offset restorer 773 is smaller than the signal power received from the positive time offset restorer 771. In this case, the time offset sign determiner 790 can determine the time offset sign as a negative value. The time offset sign determiner 790 can send the determined time offset 605 to the series/parallel conversion unit 610.

Figure 8:
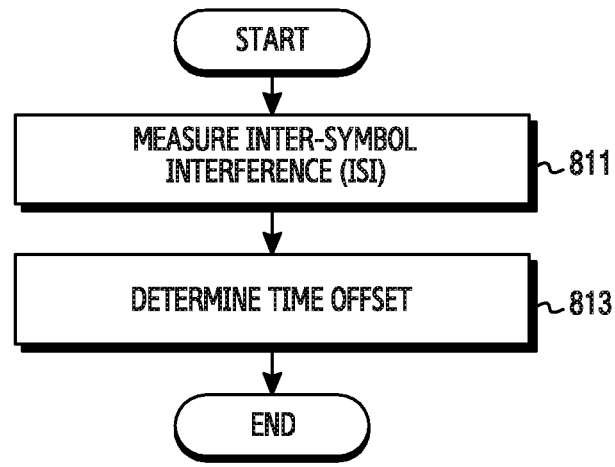
FIG. 8 is a flowchart for determining a time offset of a signal received from each terminal in a wireless communication system according to an embodiment of the present invention.

FIG. 8 is a flowchart for determining a time offset of a signal received from each terminal in a wireless communication system according to an embodiment of the present invention. FIG. 8 illustrates an operating method of the base station 110.

Referring to FIG. 8, the base station can measure ISI per terminal through a signal received from each terminal in operation 811. Herein, the ISI can include at least one of EVM or SNR. The SNR and the EVM can be obtained based on the following Equation 1 and Equation 2.

$$SNR=(P-N)/N \qquad \text{Equation 1}$$

In Equation 1, SNR denotes the SNR, N denotes an average noise power, and P denotes a sum of the average noise power N and an average signal power.

$$EVM=\sqrt{(1/SNR)} \qquad \text{Equation 2}$$

In Equation 2, EVM denotes the EVM, and SNR denotes the SNR of Equation 1.

Using the measured ISI, the base station 110 can determine the time offset per terminal in operation 813. Determining the time offset can include determining the size and the sign of the time offset.

Figure 9:
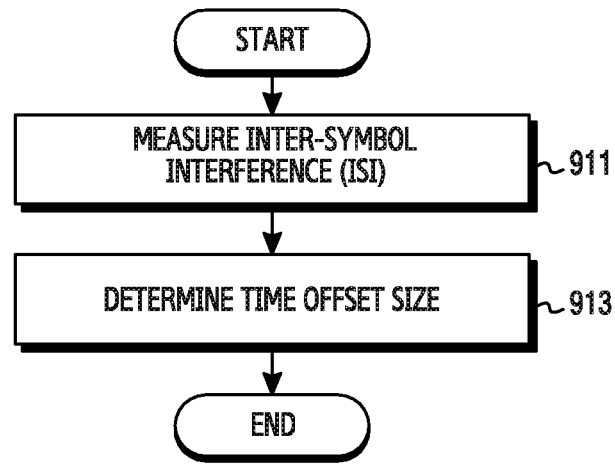
FIG. 9 is a flowchart for determining a time offset size in a wireless communication system according to an embodiment of the present invention.

FIG. 9 is a flowchart for determining a time offset size in a wireless communication system according to an embodiment of the present invention. FIG. 9 illustrates an operating method of the base station 110.

Referring to FIG. 9, the base station 110 can measure ISI for each of signals received from the terminals 101 through 104 in operation 911. Herein, the ISI can include at least one of EVM or SNR. In the FBMC scheme, a value of the EVM can have a linear relationship with the time offset. The relationship between the EVM value and the time offset shall be elucidated by referring to FIG. 10. That is, in an FBMC wireless communication system, the EVM can establish one-to-one correspondence with the time offset.

In operation 913, the base station 110 can determine a size of the time offset corresponding to the measured ISI. For example, the base station 110 can determine the time offset size from an EVM measured using characteristics of the EVM and the time offset. Using the relations of Equation 1 and Equation 2, the base station can determine the time offset size through SNR instead of the EVM.

Figure 10:
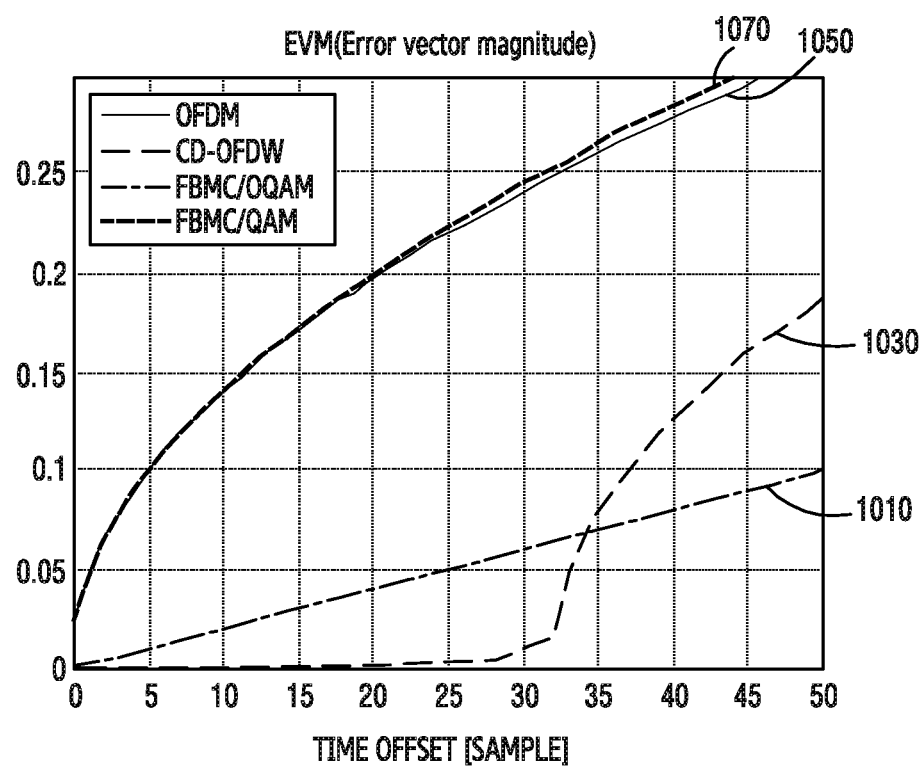
FIG. 10 is a graph showing a relationship between a time offset and an Error Vector Magnitude (EVM) in a wireless communication system according to an embodiment of the present invention.

FIG. 10 is a graph showing relationship between a time offset and an EVM in a wireless communication system according to an embodiment of the present invention. Referring to FIG. 10, the base station 110 can determine a time offset size using ISI of a signal received from each terminal. For example, referring to FIG. 10, the size (absolute value) of the time offset of the received signal can be determined using the EVM.

The FBMC system may not use a CP, unlike Orthogonal Frequency Division Multiplexing (OFDM). Accordingly, when a time offset of a signal received at the base station occurs, interference due to inter-symbol overlapping can arise. Using the ISI, the time offset can be determined. For example, FIG. 10 provides a method for determining the time offset using the EVM. FIG. 10 depicts not only an EVM performance of the FBMC system of the present invention but also EVM performances of the OFDM and CP-OFDM which are to be compared. A reference numeral 1010 can be the EVM of the FBMC/OQAM for the time offset, and a reference numeral 1030 can the EVM of the CP-OFDM for the time offset. Also, a reference numeral 1050 can be the EVM of the OFDM for the time offset, and a reference numeral 1070 can be the EVM of the FBMC/QAM for the time offset. The EVM based on the time offset is presented merely as an example, and can have a different value according to a channel condition.

Referring to FIG. 10, unlike the other systems, the EVM 1010 simply increases according to the time offset in the FBMC system. That is, the EVM and the time offset can have the one-to-one correspondence. The base station 110 can determine the size of the time offset from the measured EVM. The base station 110 can store the relation of the EVM 1010 and the time offset as a table in the storage unit 220 of FIG. 2. In FIG. 10, for example, when the EVM value is 0.1, the time offset is approximately 25. Alternatively, when the EVM value is 0.1, the time offset error is about 50. However, the time offset can obtain only the size, not the direction, in FIG. 10. This is because the FBMC symbol is bilaterally symmetric. The EVM 1010 of the FMBC/OQAM has a dull graph change for the channel and can correct the graph with the continuous channel determination. Using the relations of Equation 1 and Equation 2, the base station can determine the time offset size through the SNR instead of the EVM.

Figure 11:
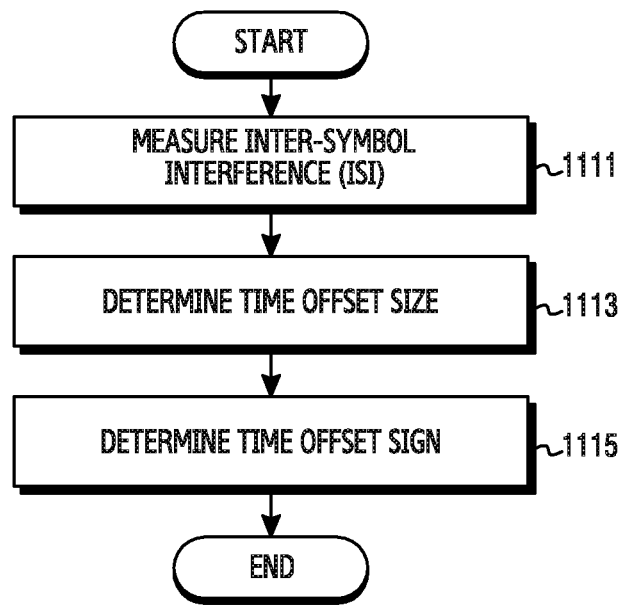
FIG. 11 is a flowchart for estimating and compensating for a time offset for several terminals of a base station in a wireless communication system according to an embodiment of the present invention.

FIG. 11 is a flowchart for estimating and compensating for a time offset for several terminals of a base station in a wireless communication system according to an embodiment of the present invention.

Referring to FIG. 11, the base station 110 can measure ISI from each of signals received from the terminals 101 through 104 in operation 1111. In other words, the base station can estimate a metric indicating an error level for the received signals of the terminals. The base station can measure a channel quality value (e.g., SNR) and estimate an EVM based on the channel quality value. For example, the base station can estimate the EVM based on Equation 1 and Equation 2.

Next, the base station 110 can determine a time offset size using the measured ISI in operation 1113. For example, the base station 110 can determine the time offset size using EVM information. Based on the graph of FIG. 10, the EVM and the time offset can have a linear relationship. Thus, the base station 110 can determine the time offset size with the EVM.

Next, the base station 110 can determine a sign (or direction) of the time offset in operation 1115. To determine the sign of the time offset, the base station can remove previous symbols from the overlappingly transmitted signals and then re-determine an interference level. According to an embodiment of the present invention, signals of several terminals conforming to the FBMC system are transmitted overlappingly and thus even signal allocated different time slots can overlap. When the base station such an overlapping signal, the ISI arises from the signals of different time slots and, as a result, the performance can be degraded. The present invention can determine the sign of the time offset using the ISI level.

Figure 12:
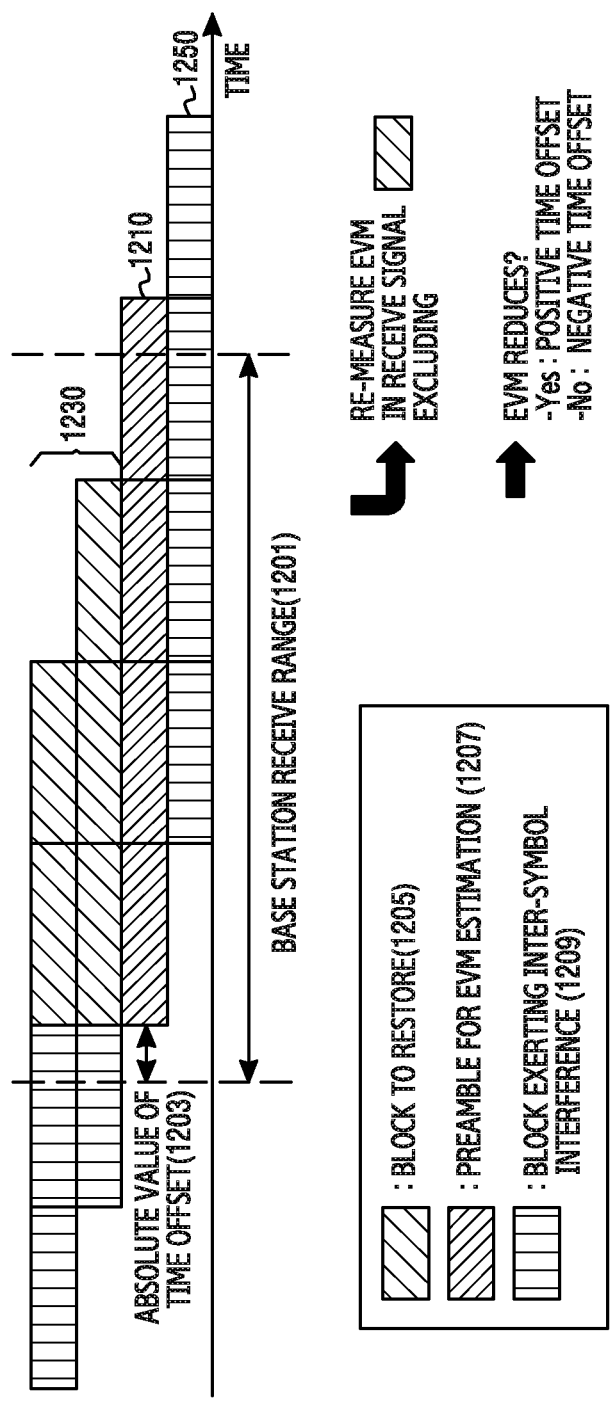
FIG. 12 depicts a method for determining a sign of a time offset in a wireless communication system according to an embodiment of the present invention.

Referring to FIG. 12, signals in a receive range 1201 of the base station 110 in FIG. 12 can be divided into a detected signal 1210 and adjacent signals 1230 and 1250. Also, the adjacent signals can be divided into the signal 1230 completely detected in a previous time slot and the signal 1250 to be detected in a next time slot. A reference numeral 1203 indicates the size (or absolute value) of the determined time offset.

Herein, the completely detected signal 1230 is completely decoded signal and known to the base station, and accordingly can be restored and removed. According to an embodiment of the present invention, a sum of interference signals from previous or next symbols can be determined by measuring ISI from the receive signal. Herein, the ISI can be reduced by restoring and precisely removing the previous symbol completely detected and measuring the ISI. However, when the restored previous symbol is not removed at the accurate time, distortion can occur. More performance degradation can be caused and the ISI can increase.

For example, referring to FIG. 12, the base station 110 can select the sign of the absolute value 1203 of the time offset as a certain positive value. According to the selection, the base station 110 can measure an EVM of the signal received from a terminal (e.g., the terminal 101) in the base station receive range 1201. The base station 110 can restore and then remove a signal of a block 1205 to restore from the receive signal. After the removal operation, the base station 110 can re-measure the EVM based on an EVM measurement preamble 1207 and a block 1209 affected by the ISI. The base station 110 can observe a variance of the EVM.

When the EVM variance is of the negative sign, that is, when the EVM decreases, the base station 110 can determine the randomly determined sign of the time offset, that is, the positive value as a final sign (e.g., direction) of the time offset. Conversely, when the EVM variance is of the positive sign, that is, when the EVM increases, the base station 110 can determine the sign of the time offset as the opposite sign of the original determined sign, that is, as the negative sign. According to another embodiment of the present invention, using the relations of Equation 1 and Equation 2, the base station 110 can determine the sign (or direction) of the time offset through the SNR instead of the EVM.

Figure 13:
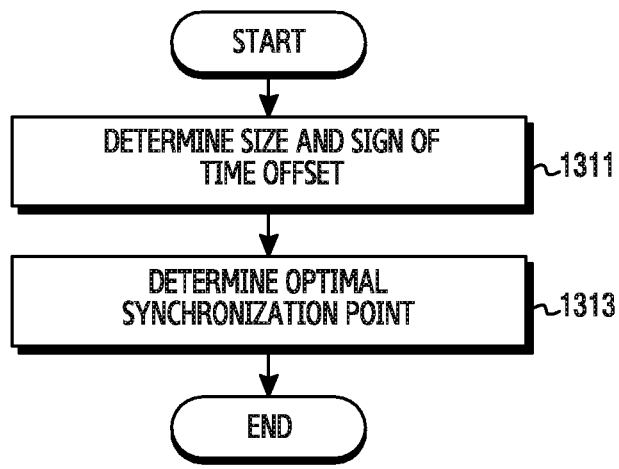
FIG. 13 is a flowchart for determining an optimal synchronization point in a wireless communication system according to an embodiment of the present invention.

FIG. 13 is a flowchart for determining an optimal synchronization point in a wireless communication system according to an embodiment of the present invention.

The base station 110 can determine time offsets of signals received from the terminals 101 through 104 in operation 1311. A method for determining the time offset can include determining a size of the time offset and a sign of the time offset. The base station 110 can receive the signals from the terminals 101 through 104. Based on the received signals, the base station 110 can measure ISI per terminal. Using a specific relation of the measured ISI and the time offset, the base station 110 can determine the time offset size of the terminals 101 through 104. The base station 110 can determine the sign or the direction of the time offset using the determined time offset size. Specifically, the base station 110 can measure the ISI by arbitrarily determining the sign of the time offset. The base station 110 can restore a signal to restore from a verified signal. The base station 110 can remove the restore signal from the received signal in a receive range and then measure the ISI. In so doing, when a variance of the ISI is of the negative sign, the base station 110 can select the first time offset sign randomly selected, as a final sign. By contrast, when the variance of the ISI is of the positive sign, the base station 110 can select the opposite sign of the first time offset sign randomly selected, as the final sign.

In operation 1313, the base station 110 can determine an optimal synchronization point based on the time offset size and sign information. In other words, the base station 110 can determine a signal detection interval in the receive signal. Herein, the detection interval indicates an interval for extracting sample values for FFT operation in order to detect one FBMC symbol. The optimal synchronization point can be determined by the control unit 230 of the base station 110. The method for determining the optimal synchronization point of the base station 110 according to an embodiment of the present invention can be determined based on Equation 3 according to a purpose.

$$\Delta t_w = \frac{\sum_i w_i(\Delta t_i) \cdot \Delta t_i}{\sum_i w_i(\Delta t_i)} \qquad \text{Equation 3}$$

In Equation 3, $\Delta t_i$ denotes a time offset of an i-th terminal, $w_i$ denotes a weight of the i-th terminal, and $\Delta t_w$ denotes a final synchronization compensation value to change from a current reference point.

Namely, the base station 110 can determine the time offset compensation value based on time offsets of terminals. More specifically, the base station 110 can determine a first value by weighting and summing the time offsets, and determine a second value by weighting the time offsets and summing products of the time offsets. The base station 110 can determine a synchronization compensation value based on the first value and the second value. For example, the base station 110 can determine the synchronization compensation value by dividing the second value by the first value. The detection interval can be determined based on the first value which sums the weights corresponding to the time offsets for the at least one terminal, and the second value which sums the products of the weights and the time offsets.

Since the offset differs per terminal, the performance degradation can also differ. Since the base station needs to consider all the terminals with fairness, the weight per terminal can applied to find an appropriate synchronization point.

Figure 14:
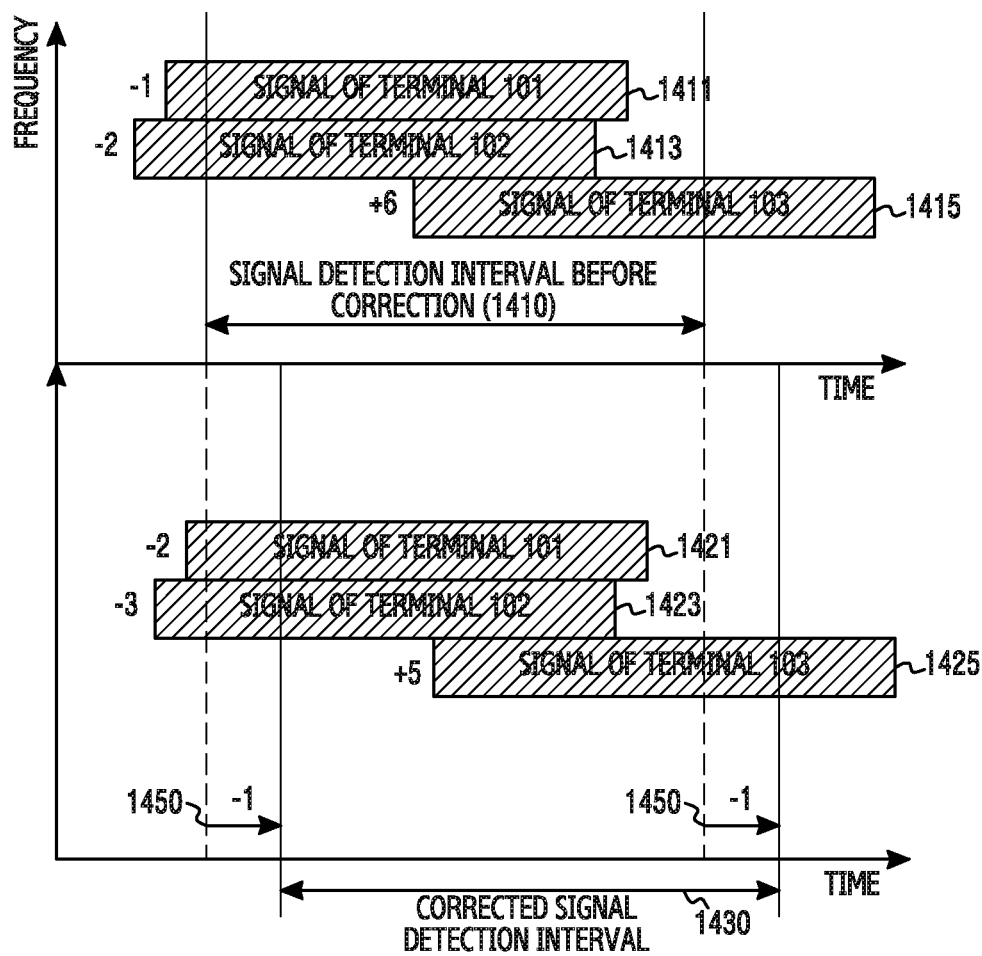
FIG. 14 depicts a method for determining an optimal synchronization point with a uniform weight in a wireless communication system according to an embodiment of the present invention.

FIG. 14 depicts a method for determining an optimal synchronization point under a uniform weight condition in a wireless communication system according to an embodiment of the present invention. There is a method for determining $w_i(\Delta t_i)=1$ for a weighted optimal synchronization point, for example, for every terminal in Equation 3. In this case, the method can determine the optimal synchronization point by considering up to the performance of a terminal having the greatest offset. For example, in FIG. 14, a reference numeral 1411 can be a signal having a time offset −1 received from the terminal 101, 1413 can be a signal having a time offset −2 received from the terminal 102, and 1415 can be a signal having a time offset +6 received from the terminal 103. A reference numeral 1410 can be a signal detection window received from each terminal before compensation. When the time offset values of the terminals 101 through 103 are applied to Equation 3 under the condition of $w_i(\Delta t_i)=1$, $\Delta t_w$ becomes −1. Hence, a final synchronization compensation value to change from a current reference becomes −1.

In FIG. 14, reference numerals 1421, 1423, and 1425 can indicate time offsets −2, −3, and +5 of the signals received from the terminals 101 through 103 after the final synchronization compensation −1 is applied. A reference numeral 1430 can indicate a detection interval of a corrected signal by applying the final synchronization compensation value −1. When the compensated time offset value for the terminals 101 through 103 is applied to Equation 3 under the condition of $w_i(\Delta t_i)=1$, $\Delta t_w$ becomes 0 (zero).

Also, under a condition of $$w_i(\Delta t_i) = \frac{1}{\Delta t_i}$$

according to an embodiment of the present invention, a method for determining an optimal synchronization point to receive a signal of a base station can be included. When $$w_i(\Delta t_i) = \frac{1}{\Delta t_i}$$

is determined in Equation 3, a synchronization point which can maximize the entire detection performance can be determined.

The embodiments under the two conditions are special cases, and the weight is not limited to the above-stated embodiments.

Figure 15:
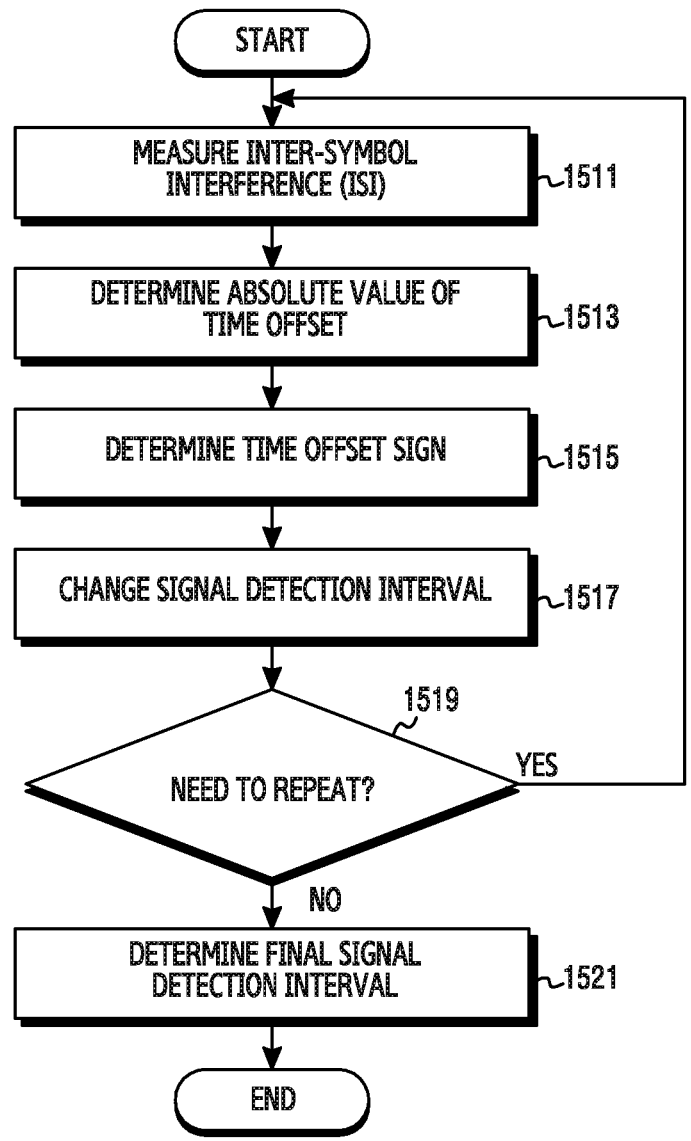
FIG. 15 is a flowchart for determining an optimal synchronization point through Inter-User Interference (IUI) compensation in a wireless communication system according to an embodiment of the present invention.

FIG. 15 is a flowchart for determining an optimal synchronization point through IUI compensation in a wireless communication system according to an embodiment of the present invention.

The base station 110 can measure ISI through signals received from several terminals in operation 1511. In so doing, the ISI can be measured by the time offset determiner 650 of the base station 110.

Next, the base station 110 can determine a time offset size using the measured ISI information in operation 1513. The base station 110 can determine the time offset size based on a modified table of the ISI versus the time offset which is generated by the table modifier 730.

Next, the base station 110 can determine a size (or direction) of the time offset in operation 1515. To determine the sign of the time offset, the base station 110 can remove a previous symbol completely verified from overlappingly transmitted signals and then re-measure the interference. According to an embodiment of the present invention, since the signals of the several terminals in the FBMC system are overlappingly transmitted, signals allocated different time slots may overlap. When the base station 110 receives such an overlapping signal, ISI arise from the signals of the different time slots and thus performance can be degraded. The present invention can determine the sign of the time offset using the size of the ISI.

Next, the base station 110 can change a signal detection interval based on the determined time offset in operation 1517. For example, the base station 110 can change the signal detection interval based on Equation 3. By changing the signal detection interval, channel estimation per user can be more clarified and thus the effect of user interference can reduce.

In operation 1519, the base station 110 can determine whether it is necessary to repeat the signal detection interval change process. For example, when the number of the detection interval changes reaches a predefined threshold or when the variance of the signal detection interval updated by the repetition falls below a predefined threshold, the base station 110 can determine whether it is necessary to repeat the detection interval change.

When determining to repeat the detection interval change, the base station 110 can re-measure the ISI in the changed signal detection interval back in operation 1511. In operation 1513, the base station 110 can re-modify the table of the ISI verses the time offset according to the detection interval change. The base station 110 can determine an absolute value of the time offset by comparing the re-measured ISI and the re-modified table. The base station 110 can re-determine the sign of the time offset based on the determined absolute value in operation 1515, and re-change the signal detection interval in operation 1517. By repeating such a process, the effect of other external factor, such as IUI, than the time offset can reduce and the base station 110 can obtain more accurate time offset result.

When determining no repetition of the signal detection interval change, the base station 110 can determine the last signal detection interval changed as a final signal detection interval in operation 1521.

Figure 16:
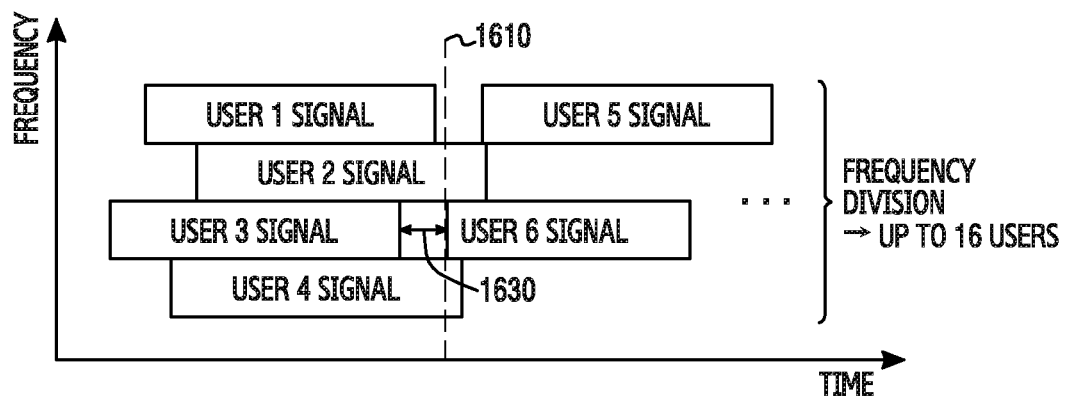
FIGS. 16 through 18 depict simulation results indicating effects according to an embodiment of the present invention.
Figure 17:
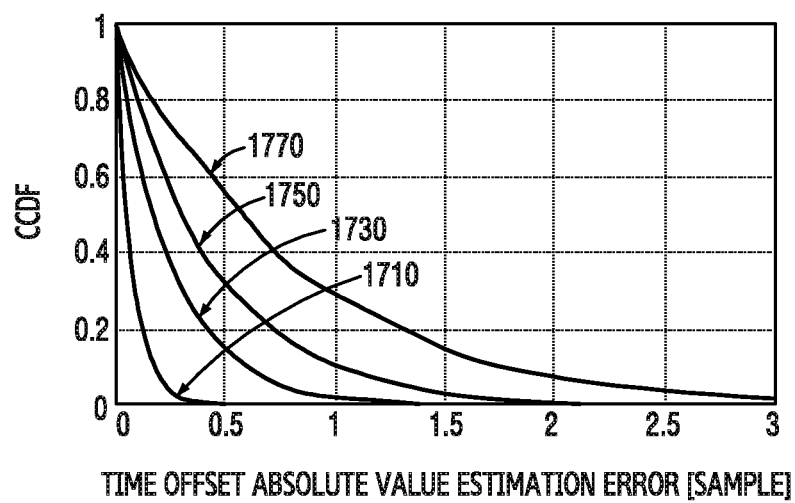
Figure 18:
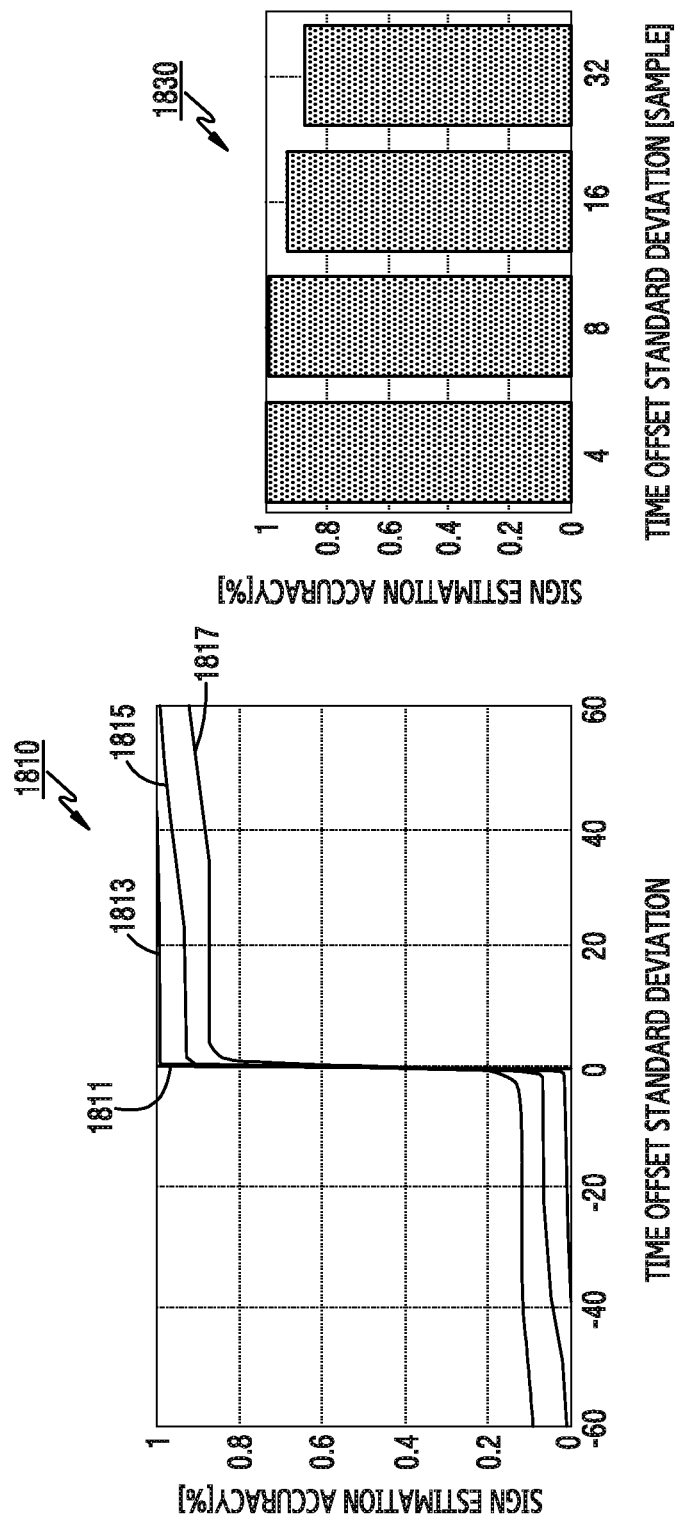

FIGS. 16 through 18 depict simulation results showing effects according to an embodiment of the present invention. A simulation is conducted in an environment of 1024 subcarriers, 16 users who simultaneously use frequency division, 63 carriers per user, and five-time oversampling. The simulation is to analyze accuracy of the time offset determined using the embodiment of the present invention. Specifically, the simulation is to analyze the accuracy in determining the absolute value of the time offset and the sign of the time offset value.

FIG. 16 depicts an example of a simulation environment where a base station receives signals from users 1 through 16 according to an embodiment of the present invention. A reference numeral 1610 indicates a signal detection interval start point which is set by the base station. A reference numeral 1630 indicates a normal distribution of the time offset.

FIG. 17 depicts simulation results of time offset absolute value estimation performance according to an embodiment of the present invention. A reference numeral 1710 is a graph regarding a relationship of an absolute value measurement error of the time offset and a Complementary Cumulative Distribution Function (CCDF) when a standard deviation of the time offset of a signal received at the base station is 4. A reference numeral 1730 is a graph regarding the relationship of the absolute value measurement error of the time offset and the CCDF when the standard deviation of the time offset of the signal received at the base station is 8. A reference numeral 1750 is a graph regarding the relationship of the absolute value measurement error of the time offset and the CCDF when the standard deviation of the time offset of the signal received at the base station is 16. A reference numeral 1750 is a graph regarding the relationship of the absolute value measurement error of the time offset and the CCDF when the standard deviation of the time offset of the signal received at the base station is 32. In FIG. 17, as the standard deviation of the time offset decreases, the base station can estimate the absolute value of the time offset quite accurately.

FIG. 18 depicts simulation results of time offset sign estimation performance according to an embodiment of the present invention. A reference numeral 1810 indicates accuracy of the time offset sign estimation when a standard deviation of the time offset is 4, 8, 16, and 32. Reference numeral 1811 through 1817 are graphs showing the sign estimation performance when the standard deviation of the time offset is 4, 8, 16, and 32. Based on the graph of the reference numeral 1810, accurate sign estimation can be achieved as the standard deviation of the time offset decreases. A reference numeral 1830 indicates a bar graph about sign estimation results. Based on the reference numeral 1830, the base station can achieve very accurate sign estimation.

The methods according to embodiments described in the claims or the specification of the present invention can be implemented in hardware, software, or a combination of hardware and software.

As for the software, a computer-readable storage medium storing one or more programs (software modules) can be provided. One or more programs stored in the computer-readable storage medium can be configured for execution by one or more processors of the electronic device. One or more programs can include instructions for controlling the electronic device to execute the methods according to the exemplary embodiments of the present disclosure.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the program can be stored in a memory combining part or all of those recording media. Also, a plurality of memories may be included.

The program can be stored in an attachable storage device accessible via a communication network such as Internet, Intranet, Local Area Network (LAN), Wide LAN (WLAN), or Storage Area Network (SAN), or a communication network by combining these networks. The storage device can access an apparatus which realizes an embodiment of the present invention through an external port. Also, a separate storage device on the communication network may access the apparatus which realizes an embodiment of the present invention.

In the above-described specific embodiments of the present invention, the elements included in the invention are expressed in a singular or plural form according to the specific embodiment. However, the singular or plural expression is appropriately selected according to a proposed situation for the convenience of explanation and the present invention is not limited to a single element or a plurality of elements. The elements expressed in the plural form may be configured as a single element, and the elements expressed in the singular form may be configured as a plurality of elements.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operating a base station in a wireless communication system, comprising:
   filtering a signal comprises a plurality of filter bank multi carrier (FBMC) symbols;
   determining interference between the FBMC symbols of the signal received from a terminal;
   determining a size of a time offset, wherein the size corresponds to the interference;
   determining a sign of the time offset, wherein the sign is one of a positive value or a negative value corresponding to the size of the time offset;
   determining the time offset of the received signal based on the determined size and the sign; and
   determining a detection interval of the signal received from the at least one terminal based on the time offset.

2. The method of claim 1, wherein determining the sign of the time offset comprises:
   removing a completely detected signal from the received signal based on the determined sign and determining a variance of the interference between the FBMC symbols; and
   determining the sign of the time offset based on the determined variance.

3. The method of claim 1, wherein determining the size of the time offset comprises:
   determining the size of the time offset with an external factor compensated using channel information,
   wherein the external factor comprises inter-user interference (IUI).

4. The method of claim 1, further comprising:
   re-determining the interference between the FBMC symbols based on the detection interval; and
   re-determining the detection interval based on the re-determined interference.

5. The method of claim 1, wherein the interference between the FBMC symbols comprises at least one of an error vector magnitude (EVM) or a signal to noise power ratio (SNR).

6. The method of claim 1, wherein the detection interval is determined based on a first value which sums a weight corresponding to the time offset for the terminal, and a second value which sums a product of the weight and the time offset.

7. The method of claim 6, wherein the detection interval is determined by changing the weight for the terminal.

8. A base station in a wireless communication system, the base station comprising:
   a transceiver; and
   at least one processor operatively coupled with the transceiver,
   wherein the at least one processor is configured to:
      filter a signal comprises a plurality of filter bank multi carrier (FBMC) symbols,
      determine interference between FBMC symbols of the signal received from at a terminal,
      determine a size of a time offset, wherein the size corresponds to the interference,
      determine a sign of the time offset, wherein the sign is one of a positive value or a negative value corresponding to the size of the time offset,
      determine the time offset of the received signal based on the determined interference, and
      determine a detection interval of the signal received from the at least one terminal based on the determined time offset.

9. The base station of claim 8, wherein the at least one processor is configured to control to:
   removes a completely detected signal from the received signal based on the determined sign,
   determine a variance of the interference between the FBMC symbols, and
   determine the sign of the time offset based on the determined variance.

10. The base station of claim 8, wherein the at least one processor is configured to determine the size of the time offset with an external factor compensated using channel information, and
   wherein the external factor comprises inter-user interference (IUI).

11. The base station of claim 8, wherein the at least one processor is further configured to:
   re-determine the interference between the FBMC symbols based on the detection interval, and
   re-determine the detection interval based on the re-determined interference.

12. The base station of claim 8, wherein the interference between the FBMC symbols comprises at least one of an error vector magnitude (EVM) or a signal to noise power ratio (SNR).

13. The base station of claim 8, wherein the detection interval is determined based on a first value which sums a weight corresponding to the time offset for the terminal, and a second value which sums a product of the weight and the time offset.

14. The base station of claim 13, wherein the detection interval is determined by changing the weight for the terminal.

* * * * *